United States Patent [19]

Rütschle et al.

[11] Patent Number: 4,768,902
[45] Date of Patent: Sep. 6, 1988

[54] MACHINE TOOL

[75] Inventors: Eugen Rütschle, Mühlheim; Rudolf Haninger, Seitingen; Hans-Henning Winkler, Tuttlingen, all of Fed. Rep. of Germany

[73] Assignee: CHIRON-Werke GmbH, Fed. Rep. of Germany

[21] Appl. No.: 906,323

[22] Filed: Sep. 11, 1986

[30] Foreign Application Priority Data

Sep. 17, 1985 [DE] Fed. Rep. of Germany ....... 3533089

[51] Int. Cl.$^4$ ............................................. B23Q 11/08
[52] U.S. Cl. ...................................... 409/134; 51/274; 29/DIG. 56; 408/241 G; 74/608
[58] Field of Search ............... 409/134, 137, 174, 224, 409/225; 51/235, 240 J, 240 A, 268, 274, 272; 29/DIG. 56; 408/241 G; 74/608, 609, 614

[56] References Cited

U.S. PATENT DOCUMENTS 2,443,734 6/1948 Kearney et al.
3,366,012 1/1968 Richter ................................. 409/134
3,703,124 11/1972 Smith et al. ........................ 409/134

FOREIGN PATENT DOCUMENTS 2365033 12/1973 Fed. Rep. of Germany.
3115584 4/1981 Fed. Rep. of Germany.
211741 11/1982 Fed. Rep. of Germany.
3320738 5/1983 Fed. Rep. of Germany.

OTHER PUBLICATIONS

Heian Iron Works Ltd., ~1975, p. 1, Figure NT-8.

Primary Examiner—Z. R. Bilinsky
Attorney, Agent, or Firm—Walter A. Hackler

[57] ABSTRACT

A machine tool comprises a displaceable work table (12) having a first area which in a first position in which it serves as the processing side carries workpieces for being processed by means of a tool of the machine tool, and a second area which in a second position in which it serves as the mounting side can receive another workpiece, the two positions of the said areas being exchangeable by displacement of the table (12), and at least one splash guard (28) which can be moved relative to the work table being arranged between the said table areas.

In order to ensure that one always has a larger working space available on the processing side to permit the spindle stock to be moved over the full area and to permit bulky and/or heavy workpieces to be loaded on the surface of the work table (12) from the mounting side, the splash guard (28) subdivides the working space defined by the areas asymmetrically. To this end, the splash guard is movable relative to the work table in such a manner that the working space ratio between the area on the processing side and the area on the mounting side remains at least approximately constant when the positions of the two areas are changed. Finally, the splash guard (28) moves automatically when the work table (12) changes its position (FIG. 3a).

6 Claims, 4 Drawing Sheets

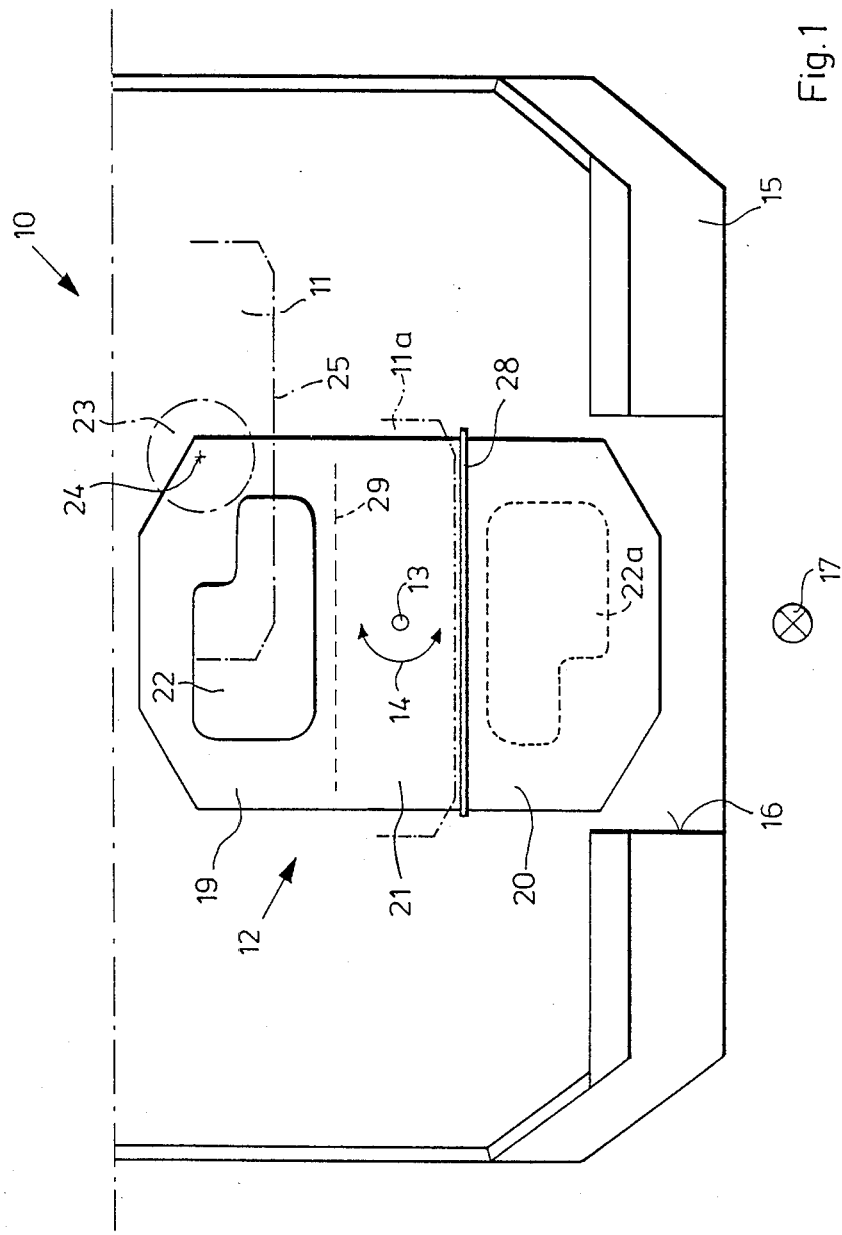

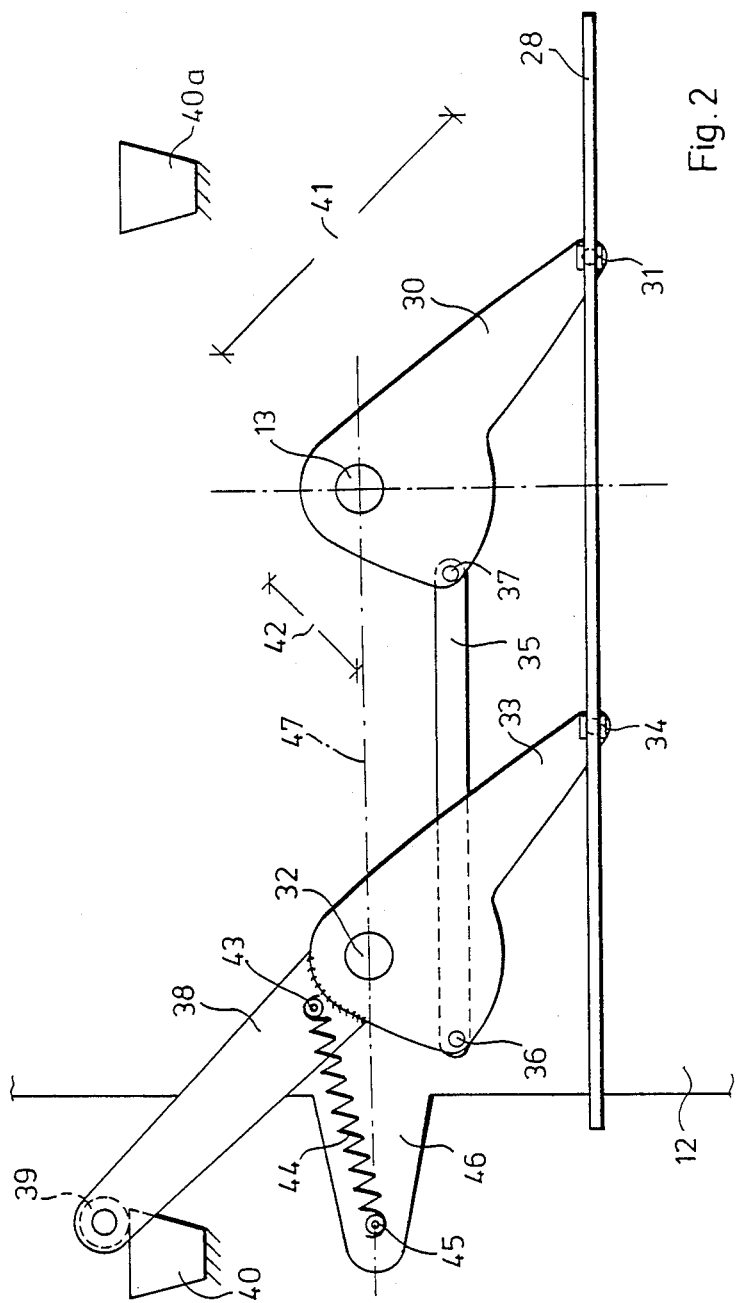

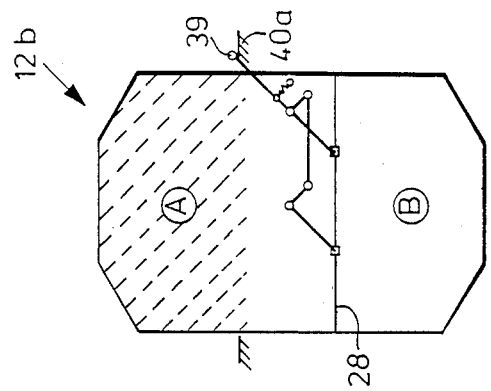
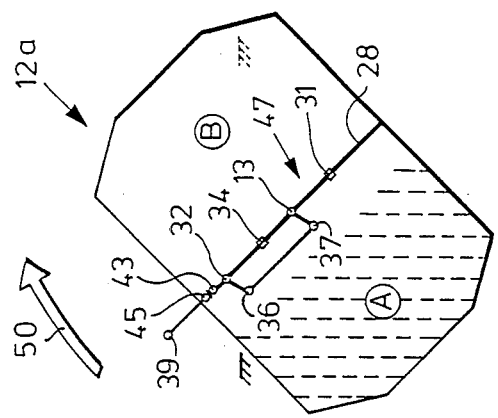
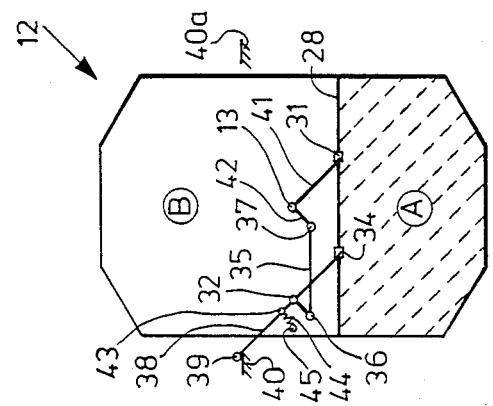
Fig. 3c
Fig. 3b
Fig. 3a

MACHINE TOOL

The present invention relates to a machine tool having a displaceable work table comprising a first area which in a first position in which it serves as the processing side carries workpieces for being processed by means of a tool of the machine tool, and a second area which in a second position in which it serves as the mounting side can receive another workpiece, the two positions of the said areas being exchangeable by displacement of the table, and at least one splash guard which can be moved relative to the work table and which is arranged between the said table areas.

A machine tool of this type has been known before from German Disclosure Document No. 33 20 738.

The known machine tool is a so-called drilling and milling center with a vertical milling stock about which a plurality of tools are arranged and where the tools can be changed into the tool carrier of the spindle stock one after the other by means of gripper arms to permit a pre-determined sequence of operating processes to be carried out on the workpiece mounted on the work table. The spindle stock can be displaced relative to the work table along several axes. In the case of the known machine tool, the work table has the form of a rotary table whose axis extends vertically and in parallel to the spindle axis and—viewed from the position of the operator of the machine—in front of the spindle axis.

In the following description, the areas of the work table that can be displaced in the region of the spindle stock and/or of the user positioned opposite the spindle stock will be described as "area", the respective positions of these areas as "position", the space above the area as "working space", and the purpose the respective areas serve in the different positions as "processing side" or "mounting side", respectively.

The work table of the known machine tool is subdivided into two areas. Every time the work table is rotated by 180°, one area serving as processing side is brought into a position near the spindle stock, while the other area serving as the mounting side is brought into a position near the user.

Now, the user can mount the next workpiece on the mounting side while the workpiece mounted on the processing side is being processed.

However, when processing workpieces, certain precautions have be be taken to prevent the operator of the machine tool from being soiled by splashing drilling coolant or even being injured by metal chips flying around. In the case of the known machine tool, therefore, the machine tool as such is fully enclosed by a cabin which is closed all round and provided on its top, in the reach of the user, with a hinged door suspended in such a manner that when the door is folded upwards its lower edge follows a path rising above the outline of a tool to be mounted and falling again behind the said outline. In its open position, the said hinged door thus forms a splash wall between the processing side and the mounting side.

However, this known arrangement requires that the hinged door be suspended and guided on its upside so that the arrangement cannot be used in cases where the cover of the machine tool has to be open on its top because, for example, very heavy and/or bulky workpieces have to be placed on the work table by means of a crane.

Another problem connected with machine tools of this type lies in the fact that although it is desirable that the whole surface of the mounting zone can be used for mounting one or more workpieces, problems are encountered when the spindle stock, with the tool mounted therein, moves close to the edge of the processing area because the casing of the spindle stock projects in this case into the opposite area on the mounting side. In this case, the splash guard would have to be arranged in the region of the mounting area to permit the tool mounted in the spindle axis to move up to the edge of the area on the processing side. When the table is then turned by 180°, the arrangement would have to be exactly the other way because now the two areas have been changed and the splash guard should be arranged on the surface of that area which previously served as the processing area. The known machine tool does not provide a solution to this problem.

From U.S. Patent Specification No. 2,443,734 another protective cover for a machine tool has been known. The machine tool is in this case a milling machine with horizontal spindle axis. A work table of circular shape—viewed from the top—is arranged beside the spindle and adapted to rotate centrically about a vertical axis. The surface of the work table is subdivided into two semi-circular areas of equal size. Above the work table, there is arranged a portal extending over the table along one diameter thereof—in a direction vertical to the spindle axis—and carrying three transparent flaps suspended thereon one beside the other on hinges similar to piano hinges. These flaps prevent on the one hand drilling coolant or the like from splashing around and serve, on the other hand, as a safety cover for the user of the machine. When the work table is turned by 180° in order to exchange the workpiece just processed against another one to be processed, the flaps hanging down from the portal are pushed open by the workpieces or the workpiece holder and return automatically to their position after passage of the workpieces. Thus, this known arrangement also provides the disadvantage that the working area of the work table has the same size on the processing side and on the mounting side.

Finally, a screen for the working spaces of neighboring rotating workpiece carriers of machine tools has been known from GDR Patent Specification No. 211 741. In the case of this known device, two work tables are arranged closely adjacent each other and adapted to rotate about vertical axes extending in parallel to each other. The workholding fixtures provided on the work tables exhibit a rectangular shape, viewed from the top, and project over the edge of the table so that the paths of movement of the tool carriers intersect when the work tables are rotated. Between the two work tables, there are provided two screens resting against the two workholding fixtures, respectively. The screens are arranged to pivot about a vertical axis extending symmetrically in front of the two work tables—viewed from the user's position. When one of the work tables is rotated, the screen resting against this table is pivoted by a relatively small angle towards the other work table, the maximum movement in the direction of the other table being effected by the projecting corner of the rectangular workpiece holder. Upon completion of the rotation, the screen returns to its initial position in which it rests against a longitudinal or narrow side of the workpiece holder and in which it is again out of the path of movement of the workpiece holder associated with the other screen. The screens just described only provide a separation between the two work tables. To screen the processing area from the outside, additional screens extending about the corner of the work tables are required so that the known arrangement offers altogether a very complex design and requires quite a number of movements to permit the workpieces to be mounted and processed by alternation.

Now, it is the object of the present invention to improve a machine tool of the type described above in such a manner that the work table is freely accessible from the mounting side, while simultaneously an efficient splash guard is provided between the processing side and the mounting side to protect the user.

According to the invention, this object is achieved by an arrangement in which the splash guard subdivides the working space defined by the areas asymmetrically so that an area on the processing side occupies a larger working space than an area on the mounting side, in which the splash guard is arranged on the work table and adapted to move in such a manner that the working space ratio between the area on the processing side and the area on the mounting side remains at least approximately constant when the positions of the two areas are changed, and in which the splash guard moves automatically when the work table changes its position.

This solves the problem underlying the invention completely and perfectly.

For, according to the invention, the position of the splash guard, for example a massive splash wall, is such, independent of the respective position of the work table, that a larger working space is available on the processing side so that the spindle stock can be moved a long way in the direction of the operator. During displacement of the table, the position of the splash guard changes automatically as the table moves, so that no additional guiding means acting from above are required. Thus, the mounting side remains freely accessible from above and can be approached without any difficulty, for example by a crane carrying a heavy or bulky workpiece. The splash guard, for example the massive splash wall, which always assumes the correct position, ensures automatically and without the need for any additional intervention that the user of the machine is protected reliably against splashing drilling coolant or metal chips flying around.

The invention, therefore, not only opens up extended applications for the machine tool, for example for heavier and bulky workpieces, but improves in addition the safety for the user.

According to a preferred embodiment of the invention, the work table is arranged to rotate about a vertical axis, the splash guard extends, in a first position, at least approximately parallel to the vertical axis and at a distance thereto and is subjected to parallel displacement when the positions are changed, and thereby moved to a second position mirror-symmetrical to the said first position, relative to the vertical axis.

This feature provides the advantage that in the case of a work table provided to rotate about a vertical axis, as the one of the known machine tool described above, the areas of the work table can be subdivided in a very simple manner by a splash wall moving automatically to and fro.

According to another embodiment of the invention, the work table is of horizontal design and can be rotated about a vertical axis, splash guards are provided on both sides of the vertical axis, with the first splash guard provided adjacent the mounting side being arranged at least approximately vertically and the second splash guard provided adjacent the processing side being inclined relative to the said first splash guard, and the said first splash guard is inclined relative to said second splash guard and the said second splash guard is brought into a vertical position when the positions are changed.

Accordingly, this embodiment of the invention also provides the advantage that the problem to be solved in connection with a machine tool of the type described above having a work table that can be rotated about a vertical axis is solved in a particularly simple manner. A particular advantage is derived from the fact that the inclined splash guard provided on the processing side is capable of catching the splashing drilling coolant and metal chips flying around and guiding them off downwards so that the space between the two splash guards is protected, in particular, against metal chips flying around and thus suited for accommodation of a simple mechanical mechanism ensuring the oppositely directed movement of the two splash guards during rotation of the table.

The fact that the working space on the processing side is somewhat reduced in this case by the second inclined splash guard, compared with the embodiment of the invention described before, does not present a notable disadvantage because usually the casing of spindle stocks also presents a shape tapering towards the tool so that the inclined position of the splash guard matches the inclined casing of the spindle stock.

In the case of the two before-described embodiments of the invention, a particularly favorable effect is achieved by an arrangement in which a parallelogram guide is used for moving the splash guard or splash guards, comprising one pair of joints which is mounted on the work table along a straight line intersecting the vertical axis and another pair of joints moving the splash guard or splash guards, in which a spring arrangement acts between the parallelogram guide and the work table and exerts upon the parallelogram guide a force tending to return it to a zero position in which the pairs of joints are at least approximately aligned with each other, and in which the parallelogram guide comprises an actuating lever which abuts against a fixed stop before the work table reaches one of two end positions which are set off by 180° relative to the said vertical axis.

These features provide the advantage to permit a particularly simple, sturdy and automatic movement of the splash guard or splash guards. The parallelogram guide which is actuated automatically by the actuating lever and fixed stops when the work table is turned, comprises only a minimum of elements which makes it extremely simple and resistant against trouble. The spring arrangement provides the advantage that during rotation of the work table in the area outside the fixed stops the splash guard or splash guards move automatically into a symmetrical zero position along the central axis of symmetry of the work table and are deflected automatically shortly before the end positions are reached because the actuating lever abuts at this point against one of the stops.

In the case of the embodiment described first having only a single splash guard, the parallelogram guide explained before may be further improved in an advantageous manner if the said other pair of joints carries the splash guard.

This feature provides the advantage that the splash guard forms itself one bar of the four-bar mechanism of the parallelogram guide so that only a minimum of actuating elements is required.

In the case of the other embodiment using two splash guards that can be inclined relative to each other, the parallelogram guide may, conveniently, be designed in such a manner that the other pair of joints comprises guide holes for bars which interconnect the splash guards in the direction of their inclination and which are shorter in length than the distance between the said splash guards.

This feature provides the advantage that the oppositely directed inclination of the splash guards can be effected in the direction of inclination by a trapezoidal four-bar linkage which is actuated in turn by the second pair of joints of the parallelogram guide. In spite of its increased complexity, compared with the first embodiment of the invention, this embodiment also requires only a minimum of actuating elements.

Other advantages of the invention will become apparent from the following specification and the drawing. It is understood that the features that have been described before and will be explained hereafter can be used not only in the given combination, but also in any other combination or separately, without leaving the scope of the invention. In particular, it goes without saying that the invention is by no means restricted to machine tools with horizontal work tables that can be rotated about a vertical axis, but that it can be used with advantage also in connection with work tables which are guided in a different manner, in particular tilted or displaced about any space axis.

Certain embodiments of the invention will be described hereafter in greater detail with reference to the drawing in which:

FIG. 1 shows a top view, partially broken away, of one embodiment of a machine tool according to the invention;

FIG. 2 is a diagrammatic representation of the details of a parallelogram guide for actuating a splash wall of a machine tool according to the invention;

FIGS. 3a to 3c show diagrammatic representations of three phases of the rotary movement of a work table effected by a parallelogram guide according to FIG. 2;

Figure 4A:
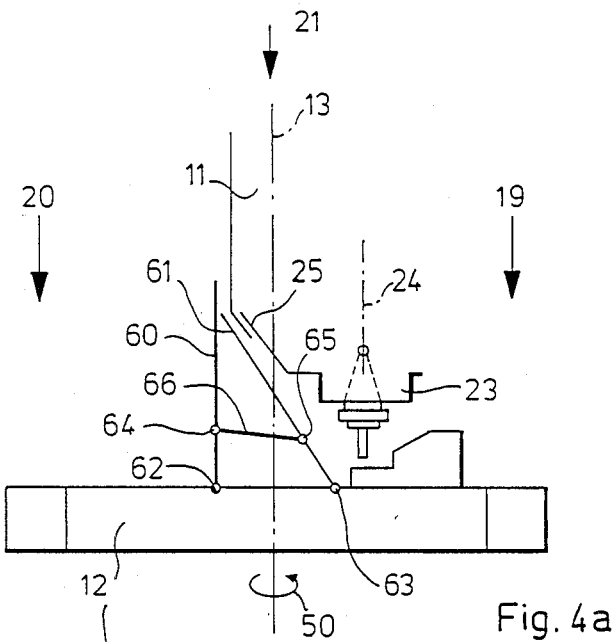
FIGS. 4a and 4b show diagrammatic lateral and top views of a detail of another embodiment of the machine tool according to the invention.

In the top view of FIG. 1, part of the front portion of a machine tool is designated by reference numeral 10. A spindle stock 11, of which only the outlines are indicated by dash-dotted lines, can be displaced in the drawing plane, as indicated by a second position 11a. There can be further seen a work table which is designated as a whole by reference numeral 12 and which can be rotated by 180° about a vertical axis 13 extending perpendicularly to the drawing plane, in the directions indicated by the double arrow 14. The machine tool 10 is enclosed on all sides by a cover whose front portion facing the user is designated by reference numeral 15. The front cover 15 is provided with an opening 16 so that the user can take a position at a point 17 in front of the machine tool 10 or a bulky or heavy tool can be transported into the interior space of the cover from the front and onto the work table 12 by means of a crane.

The surface of the work table 12 is subdivided into a processing side 19 in the area of the spindle stock 11 and a mounting side 20 near the opening 16, with a central portion 21 being arranged between these two portions. On the processing side 19, a mounted workpiece 22 can be seen, while another workpiece 22a can be mounted by the user on the mounting side 20 within the outline shown in dashed lines, for the next processing operation. It can be seen that the workpieces 22, 22a do not project beyond the surfaces of the processing side 19 and the mounting side 20, respectively.

The spindle stock 11 projects a certain distance beyond the spindle 23 extending along the spindle axis 24 because the spindle stock 11 is enclosed by a casing 25 housing the drive elements, the gripper arms for changing the tools, a tool magazine, and the like. It is, therefore, understood that during machining of the workpiece 22 a certain clear space must be reserved on the processing side 19 relative to the mounting side 20 so that the spindle stock 11 can be advanced far enough to permit the spindle axis 24 to move over the whole surface of the workpiece 22. This clear space is provided by the central portion 21 which is clear of the workpieces 22, 22a.

In order to protect a user who, standing in front of the machine at the point 17, mounts a workpiece 22a while the workpiece 22 is being machined, from splashing drilling coolant and metal chips flying around, a splash wall 28 is arranged between the mounting side 22 and the central portion 21. This particular location of the splash wall 28 permits the spindle stock 11, with its casing 25, to be moved right up to the splash wall 28, as indicated by reference numeral 11a, and the spindle axis 24 can accordingly move over the whole surface of the processing side 19.

However, it is also obvious that the splash wall 28 cannot be mounted rigidly in the position shown in FIG. 1 because it would in this case, after rotation of the work table 12 by 180°, assume a position 29 in which it would obstruct the processing of the workpiece 22a which would then be located on the processing side 19.

The splash wall 28 is, therefore, movable in the manner that will be described hereafter with reference to FIG. 2:

It can be seen that the splash wall 28 forms one longitudinal side of a parallelogram guide. A first lever 30 carrying on its free end the splash wall 28 via a joint 31 is arranged to pivot about the vertical axis 13. A second lever 33 which likewise carries on its free end the splash wall 28 via a joint 34 is mounted to pivot about another axis 32 arranged at a certain spacing from the vertical axis 13. A bar 35 interconnecting the levers 30, 33 by means of joints 36, 37 ensures that the two levers 30, 33 are moved in synchronism. The levers 30, 33 therefore take the form of two-armed levers, with a first lever arm 41 carrying the splash wall 28 and a second lever arm 42 guiding the bar 35.

It results that the parallelogram guide is formed on the one hand by the surface of the table 12, with the first pair of joints 13, 32, the two levers 30, 33 and, finally, the splash wall 28 with the two joints 31/34. Strictly speaking, the bar 35 could also be dispensed with; it serves essentially as a means to avoid that the forces necessary for moving the parallelogram guide have to be transmitted by the splash wall 28.

For operation of the parallelogram guide, a third lever 38 forming an actuating lever and carrying on its free end a roller 39 is fixed rigidly on the second lever 33. In the position shown in FIG. 2, the roller 39 rests against a first fixed stop 40. Another fixed stop 40a is arranged symmetrically opposite the said first stop 40, relative to the axes 13, 32.

The third lever 38 is provided near its axis of rotation 32 with another joint 43 which is engaged by one end of a tension spring 44. The other end of the tension spring 44 is fastened to a joint 45 provided on a projection 46 of the work table 12. The joint 45 and the axes 32 and 13 are all provided on one straight line 47.

The operation of the parallelogram guide shown in FIG. 2 will now be described with reference to the different phases of movement shown in FIGS. 3a to 3c:

For greater clarity, one of the areas of the work table 12 is designated by A, the other one by B in the representations shown in FIGS. 3a to 3c. *In the initial position* shown in FIG. 3a, the zone of the area A which is shaded by dashed lines is positioned on the mounting side, while the area B is positioned on the processing side. The parallelogram guide with its elements 30 to 42 occupies its final end position shown already in FIG. 2. Identical parts are designated by identical reference numerals in FIGS. 2 and 3a to 3c.

Now, when the work table 12 is rotated into the position 12a shown in FIG. 3, in the direction indicated by arrow 50, the roller 39 is disengaged from the first fixed stop 40. The parallelogram guide is moved into a zero position, under the action of the tension spring 44, in which the roller 39, the joints 45, 43, 32, 34, 13, 31 and the splash wall 28 as well are all arranged along one straight line 47.

Figure 4B:
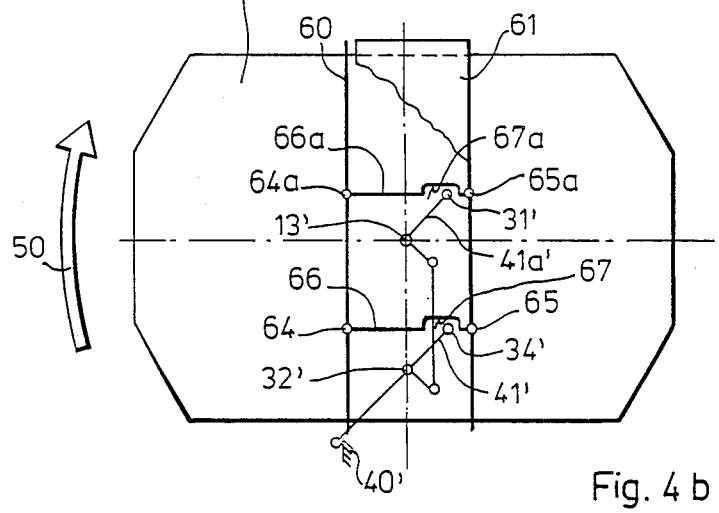

When the work table 12 is rotated further from the position 12a shown in FIG. 3b in the direction indicated by arrow 50 into the end position 12b of FIG. 3c opposite to that shown in FIG. 3a, the roller 39 runs up against the second fixed stop 40a, shortly before this end position 12a is reached, and the parallelogram guide with its elements 30 to 42 is opened again, against the action of the tension spring 44, to occupy a position symmetrical to that shown in FIG. 3a. This brings the splash wall 28 into a position at a certain distance from the center of the mounting side 22, but now the areas A and B have changed their locations. FIGS. 4a and 4b show lateral and top views of another embodiment of the invention.

In the lateral view of FIG. 4a, one can see the work table 12—which as such is unchanged—comprising the processing side 19 with the spindle stock 11 and the mounting side 20. However, contrary to the embodiments shown in FIGS. 1 to 3, the embodiment shown in FIG. 4 does not comprise one, but rather two splash walls which are designated by reference numerals 60 and 61. The first splash wall 60 is arranged perpendicularly relative to the surface of the work table 12 in a position corresponding to the position of the splash wall 28 in FIG. 1. The second splash wall 61 is arranged symmetrically to the first splash wall 60, relative to the perpendicular axis 13. It is, however, inclined away of the processing side 19 and may, for example, touch the first vertical splash wall 60 by its upper free edge.

As can be clearly seen in FIG. 4a, the inclined arrangement of the second splash wall 61 does not lead to a substantial loss in working space in the area of the processing side 19 because the case 25 of the spindle stock 11 is anyway tapered downwardly in the direction of the spindle axis 24 so that the spindle axis 24 can be advanced right to the periphery of the area on the processing side 19. On the other hand, however, the second inclined splash wall 61 is excellently suited to guide the splashing drilling coolant or metal chips off to the bottom so that they are prevented from getting into the central area 41 between the splash walls 60, 61 which accommodates the mechanism ensuring the oppositely directed movement of the splash walls 60, 61.

In order to effect this oppositely directed movement, the splash walls 60, 61 are pivoted on the surface of the work table 12 in hinges 62, 63. Joints 64, 65 connected with one bar 66 or several parallel bars 66, 66a, are provided on the splash walls 60, 61 at equal distances from the hinges 62, 63. From this it appears that the bar 66 and the joints 64, 65, the lower sections of the splash walls 60, 61, the hinges 62, 63 and the surface of the work table 12 in the area of its central portion 21 form together a trapezoidal four-bar linkage. This four-bar linkage can be moved into the position shown in FIG. 4a and into a position mirror-symmetrical thereto, relative to the vertical axis 13, in which position the said first splash wall 60 occupies an inclined, and the said second splash wall 61 occupies a vertical position In order to effect this reciprocating movement in synchronism with the reciprocating rotation of the work table 12 by 180°, there is provided a parallelogram guide shown in FIG. 4b which largely corresponds to that shown in FIGS. 2 and 3. In FIG. 4b, the same reference numerals have been used for equivalent elements of the parallelogram guide as in FIGS. 2 and 3, if necessary supplemented only by an apostrophy.

In FIG. 4b it can be clearly seen that the free ends of the lever arms 41' do not carry the splash wall directly, as in the case of the embodiment illustrated in FIGS. 2 and 3; rather, the free ends engage oblong holes 67 and 67a of two mutually spaced bars 66 and 66a which connect the splash walls 60 and 61 in the manner illustrated in FIG. 4a. When the work table 12 is rotated in one direction, the parallelogram guide is initially moved into the zero position under the action of a tension spring which; for clarity's sake, is not shown in FIG. 4b, in which the splash walls 60, 61 form an equal triangle together with the base defined by the central portion 21, as shown in FIG. 4a. Shortly before the second end position is reached at the end of the rotary angle of 180°, the parallelogram guide opens again symmetrically in a direction opposite to the original direction, and the splash walls 60, 61 assume a position symmetrically opposite to that shown in FIG. 4a.

We claim:
1. A machine tool comprising:
a spindle stock;
a rotatable work table having an upper surface thereon, said rotatable work table being alternatively rotatable around an axis perpendicular to said upper surface from a first position at which a first portion of said upper surface is disposed proximate said spindle stock and serves as a processing area and a second portion of said upper surface is disposed distal to said spindle stock and serves as a mounting area, to a second position at which the upper surface second portion is disposed proximate said spindle stock and serves as a processing area and the upper surface first portion is disposed distal to said spindle stock and serves as a mounting area;
splash guard means for separating said processing and mounting areas; and
means mounting said splash guard means to the rotatable table for causing the splash guard to move relative to the upper surface in order that the processing area remains larger than the mounting area when either the first or second portions of the upper surface is proximate the spindle stock.

2. The machine tool according to claim 1 wherein the work table is disposed in a horizontal relationship and configured for rotation about a vertical axis, and said splash guard means is disposed parallel to the vertical axis in a spaced apart relationship therewith and subject to parallel displacement when the rotatable table is rotated from the first to the second position.

3. The machine tool according to claim 2 further comprising parallelogram guide means for moving the splash guard means, said parallelogram guide means comprising a pair of levers, each having a joint mounted on the work table along a straight line intersecting the vehicle axis and another joint attached to the splash guard means, spring means for exerting a force tending to align the joints with one another and an activation lever which abuts against a fixed stop before the work table reaches one of the two positions which are set off by 180 degrees relative to the vertical axis.

4. A machine tool comprising:
a spindle stock;
a rotatable work table disposed in a horizontal relationtionship and having an upper surface thereon, said rotatable work table being configured for rotation about a vertical axis from a first positon at which a first portion of said upper surface is disposed proximate said spindle stock and serves as a processing area and a second portion of said upper surface is disposed distal to said spindle stock and serves as a mounting area, to a second position at which the upper surface second portion is disposed proximate said spindle stock and serves as a processing area and the upper surface first portion is disposed distal to said spindle stock and serves as a mounting area; and
splash guard means for separating said processing and mounting areas, said splash guard means comprising a first and a second splash guard, one disposed on each side of said vertical axis, with the first splash guard disposed proximately the mounting area being approximately parallel to said vertical axis and the second splash guard disposed proximate the processing area being at an angle with said vertical axis, and further comprising means for causing the first splash guard to be disposed at an angle with the vertical axis and the second splash guard to be disposed approximately parallel to the vertical axis when the work table is rotated 180 degrees.

5. The machine tool according to claim 4 wherein the first and second splash guards are pivoted on the surface of the work table and the splash guard means further comprises guide holes on each of the first and second splash guards for interconnection with a bar, said bar being shorter in length than the distance between the pivots of the splash guards.

6. A machine tool comprising:
a spindle stock;
a working table, said table having an upper surface subdivded along a borderline into a mounting area and a processing area;
a splash guard being arranged on said table and extending perpendicularly from said surface along said borderline;
first means for alternately rotating said working table together with said splash guard around an axis perpendicular to said surface by an angle of, preferably, 180°, wherein in a first tale position a first portion of said surface is located adjacent said spindle stock and serving as said processing area within which said machine tool is working on a first workpiece arranged on said processing area and a second portion of said surface is located at a distance from said spindle stock and serving as said mounting area for taking away a second, worked workpiece from and mounting a fresh third workpiece on said mounting area while said first workpiece is being worked, and wherein in a second position said first portion is located at a distance form said spindle stock and serving, in said second position, as said mounting area, whereas said second portion is located adjacent said spindle stock and serving, in said second position, as said processing area;
second means for displacing said splash guard on said surface in synchronism with said alternate rotation of said working to able such that in both said position said processing area is made larger than said mounting area.

* * * * *